United States Patent
Yasue

(10) Patent No.: US 10,702,959 B2
(45) Date of Patent: Jul. 7, 2020

(54) SEAL MEMBER TAKING-OUT DEVICE

(71) Applicant: KYB CORPORATION, Minato-ku, Tokyo (JP)

(72) Inventor: Takanori Yasue, Tokyo (JP)

(73) Assignee: KYB Corporation, Minato ku, Tokyo (JP)

( * ) Notice: Subject to any disclaimer, the term of this patent is extended or adjusted under 35 U.S.C. 154(b) by 154 days.

(21) Appl. No.: 15/762,250

(22) PCT Filed: Sep. 23, 2016

(86) PCT No.: PCT/JP2016/077993
§ 371 (c)(1),
(2) Date: Mar. 22, 2018

(87) PCT Pub. No.: WO2017/057181
PCT Pub. Date: Apr. 6, 2017

(65) Prior Publication Data
US 2018/0281130 A1    Oct. 4, 2018

(30) Foreign Application Priority Data

Sep. 29, 2015  (JP) .................................. 2015-191024

(51) Int. Cl.
*B23P 19/04*    (2006.01)
*B23P 19/08*    (2006.01)
*F16J 15/3268*  (2016.01)

(52) U.S. Cl.
CPC ............. *B23P 19/04* (2013.01); *B23P 19/084* (2013.01); *F16J 15/3268* (2013.01)

(58) Field of Classification Search
CPC ... B23B 5/00; B23B 5/04; B23P 11/00; B23P 11/005; B23P 19/02; B23P 19/08;
(Continued)

(56) References Cited

U.S. PATENT DOCUMENTS

2006/0265873 A1    11/2006 Pierce

FOREIGN PATENT DOCUMENTS

CN    103465001 A    12/2013
JP    S54-161169 A   12/1979
(Continued)

OTHER PUBLICATIONS

English machine translation pf JP2012111015 (Year: 2008).*
(Continued)

*Primary Examiner* — Monica S Carter
*Assistant Examiner* — Alberto Saenz
(74) *Attorney, Agent, or Firm* — Smith, Gambrell & Russell, LLP

(57) ABSTRACT

Providing a seal member taking-out device which can successfully take out a larger number of seal members. The seal member taking-out device includes a shaft member, a cylinder member, a moving member, and a taking-out member. The shaft member is columnar or cylindrical. The cylinder member is cylindrical and the shaft member is inserted through the cylinder member so that the cylinder member is movable in a direction of a central axis of the shaft member. The cylinder member is shorter than the shaft member and extends in the direction of the central axis of the shaft member. The moving member moves a plurality of seal members stacked on the shaft member and the cylinder member, in a direction of a distal end of the shaft member. The taking-out member takes out the seal members from the distal end of the shaft member.

13 Claims, 4 Drawing Sheets

(58) Field of Classification Search
CPC ........ B65H 29/64; B65H 3/32; F16J 15/3268; F16C 13/00; B30B 15/0052
USPC .......... 29/255, 271, 278, 280, 525; 269/3, 6, 269/95; 100/269.21
See application file for complete search history.

(56) References Cited

FOREIGN PATENT DOCUMENTS

| | | |
|---|---|---|
| JP | H02-145221 A | 6/1990 |
| JP | 2001-287123 A | 10/2001 |
| JP | 2002-154022 A | 5/2002 |
| JP | 2003-117736 A | 4/2003 |
| JP | 2003-245830 | 9/2003 |
| JP | 4382007 B2 | 12/2009 |
| JP | 2012111015 A * | 6/2012 |

OTHER PUBLICATIONS

First Office Action for Chinese Patent Application No. 201680056109.4 dated Jul. 26, 2019 (3 pages in Chinese with English Translation).
Search Report for Chinese Patent Application No. 201680056109.4 dated Jul. 17, 2019 (2 pages in Chinese with English Translation).
International Search Report for PCT/JP2016/077993, dated Dec. 20, 2016 in English and Japanese Language.

* cited by examiner

SEAL MEMBER TAKING-OUT DEVICE

TECHNICAL FIELD

The present invention relates to a seal member taking-out device.

BACKGROUND ART

Patent Document 1 discloses a conventional seal member taking-out device. This seal member taking-out device includes a base, a conveying plate, a conveying base, a conveying cylinder, and an elevating cylinder. The base is a flat plate spreading horizontally. The conveying plate is also a flat plate spreading horizontally. The conveying plate is provided with a plurality of elongate holes each extending therethrough in a thickness direction and further extending in a right-left direction. The conveying plate is located above the base and coupled to the base to be in parallel to the base. The conveying base is a flat plate spreading horizontally. The conveying base is disposed under the conveying plate to be in parallel to the conveying plate. The conveying base is provided with a plurality of positioning pins extending upward from an upper surface thereof. The positioning pins are inserted through the elongate holes provided in the conveying plate so that distal ends of the positioning pins can protrude upward from the upper surface of the conveying plate. The conveying base is movable in a right-left direction relative to the conveying plate with the positioning pins protruding above the conveying plate. The conveying cylinder can horizontally reciprocate the conveying base. The elevating cylinder can vertically reciprocate the conveying base.

This seal member taking-out device can convey and take out seal members (O-rings) each having an annular shape. First, seal members are placed on the upper surface of the conveying plate. Next, the elevating cylinder is driven to move the conveying base upward so that three positioning pins are inserted through the elongate holes of the conveying plate and the distal ends of the positioning pins protrude above the conveying plate. In this case, the positioning pins abut against the left side of an inner peripheral surface of the seal member. In more detail, a first one of the positioning pins abuts against an inner left end of the annular shape of the seal member, and second and third positioning pins are respectively disposed 45° away from the first one clockwise and counterclockwise about a central axis of the annular shape. Subsequently, the conveying cylinder is driven to move the conveying base leftward, so that the distal ends of the positioning pins are moved leftward while protruding above the conveying plate with the result that the seal member is conveyed leftward. Subsequently, the elevating cylinder is driven to move the conveying base downward, so that the distal ends of the positioning pins are moved downward under the conveying plate. Subsequently, the conveying cylinder is driven to move the conveying base rightward. Thus, this seal member taking-out device can convey and take out the seal members while the seal members are each maintained in the annular shape.

PRIOR ART DOCUMENT

Patent Documents

Patent Document 1: Japanese Patent Application Publication JP A-2003-117736

SUMMARY OF THE INVENTION

Problem to be Overcome by the Invention

The seal member taking-out device of Patent Document 1 conveys and takes out the seal member placed on the upper surface of the conveying plate by moving leftwards the conveying base on which the positioning pins are provided. Accordingly, in the case where a large number of seal members are to be automatically conveyed and taken out in this seal member taking-out device, the seal members are required to be aligned in the right-left direction on the upper surface of the conveying plate. In other words, in the case where a large number of seal members are to be automatically conveyed and taken out in this seal member taking-out device, a dimension of the conveying plate in the right-left direction is increased. Furthermore, it is time-consuming to align a large number of seal members on the seal member taking-out device.

The present invention was made in view of the above-described circumstances in the conventional art and has an object to provide a seal member taking-out device which can successfully take out a large number of seal members.

Means for Overcoming the Problem

A seal member taking-out device in accordance with the present invention includes a shaft member, a cylinder member, a moving member, and a taking-out member. The shaft member is columnar or cylindrical. The cylinder member is cylindrical and the shaft member is inserted through the cylinder member so that the cylinder member is movable in a direction of a central axis of the shaft member. The cylinder member is shorter than the shaft member and extends in the direction of the central axis of the shaft member. The moving member moves a plurality of seal members stacked on the shaft member and the cylinder member, in a direction of a distal end of the shaft member. The taking-out member takes out the seal members from the distal end of the shaft member.

The cylinder member in the invention may be moved in the direction of the distal end of the shaft member together with the seal members by a friction force generated when inner peripheral surfaces of the stacked seal members abut against an outer peripheral surface of the cylinder member.

The shaft member in the invention may have a proximal end located lower in a gravity direction than the distal end thereof. Furthermore, the cylinder member may fall under its own weight when number of the seal members stacked on the outer peripheral surface of the cylinder member is reduced after upward movement with a result that the friction force is rendered smaller.

The shaft member in the invention may have a diameter-expanded part formed on a distal end part thereof to have an outer diameter larger than an inner diameter of the cylinder member.

The shaft member may have a cushion member provided on an outer peripheral surface of a proximal end part thereof.

BEST MODE FOR CARRYING OUT THE INVENTION

First embodiment of the seal member taking-out device in accordance with the invention will be described with reference to the drawings.

First Embodiment

Figure 1:
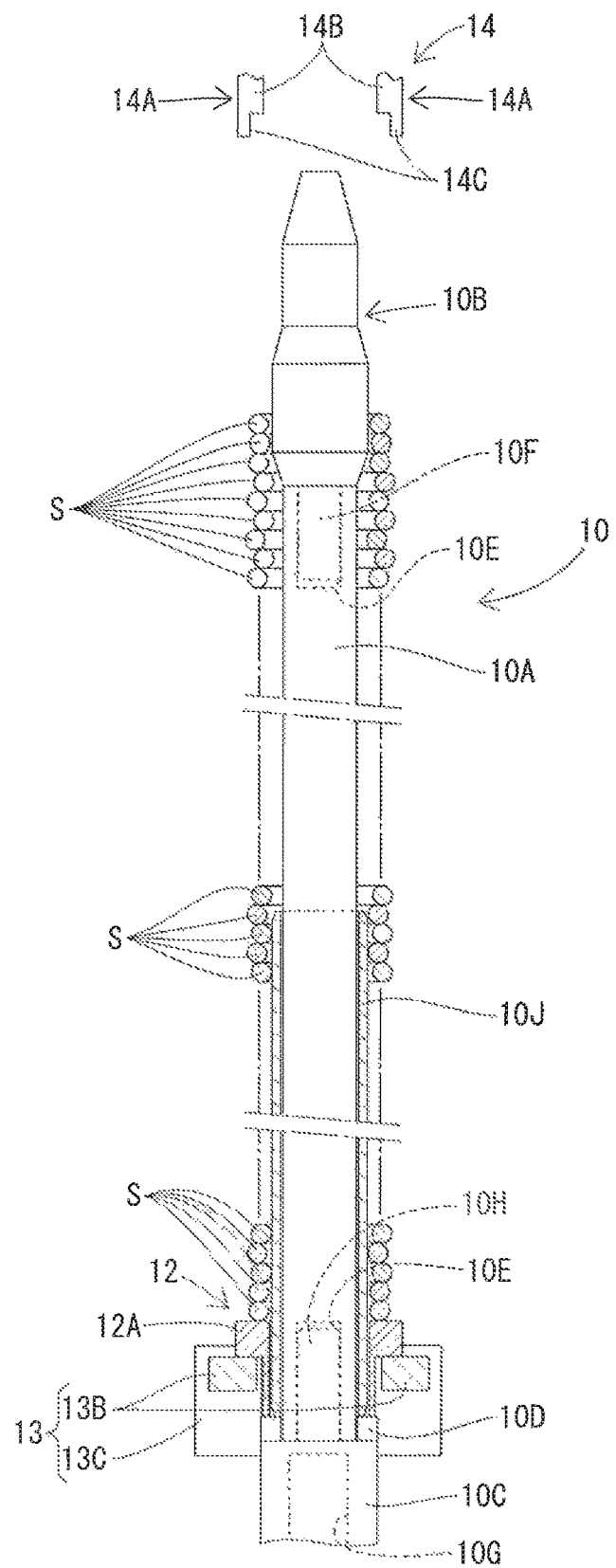
FIG. 1 is a longitudinal section of the seal member taking-out device of a first embodiment, illustrating a plurality of seal members stacked on a shaft member from a lower end part to an upper end part of the shaft member.
Figure 2:
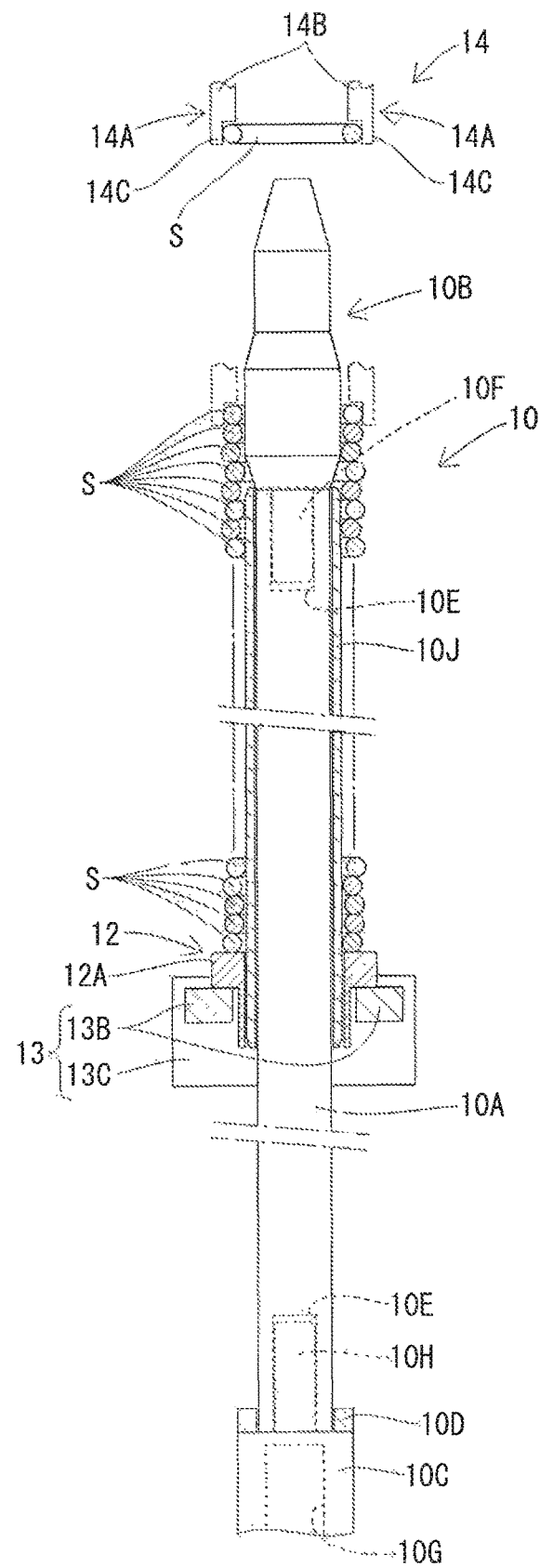
FIG. 2 is a longitudinal section of the seal member taking-out device of the first embodiment, illustrating a support member, a plurality of seal members and a cylinder member all moved upward by a moving member.
Figure 3:
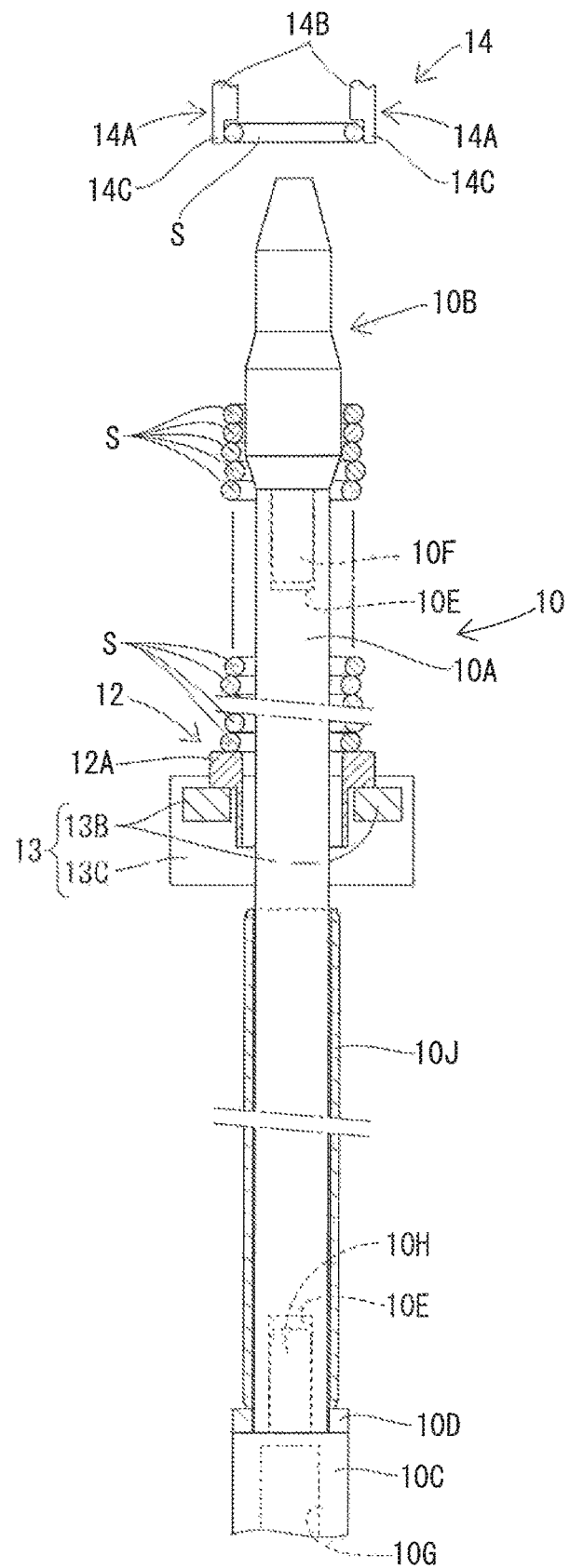
FIG. 3 is a longitudinal section of the seal member taking-out device of the first embodiment, illustrating the support member and the seal members moved upward by the moving member and the cylinder member fallen downward.

As shown in FIGS. 1 to 3, the seal member taking-out device of the first embodiment includes a shaft member 10, a cylinder member 10J, a support member 12, a moving member 13, and a taking-out member 14.

The shaft member 10 has a shaft member body 10A, a diameter-expanded part 10B, a root part 10C, and a cushion member 10D. The shaft member body 10A has a columnar shape and extends in an up-down direction (as viewed in FIG. 1; and the same shall apply hereinafter). The shaft member body 10A has an upper end surface and a lower end both of which are provided with an opening 10E extending on a central axis of the columnar shape.

The diameter-expanded part 10B has a columnar shape and extends in the up-down direction. The diameter-expanded part 10B has a larger outer diameter in a lower side thereof than an upper side thereof. The outer diameter of the upper side of the diameter-expanded part 10B is slightly smaller than an outer diameter of the shaft member body 10A. The upper side of the diameter-expanded part 10B has an upper end part formed into the shape of a circular truncated cone which is tapered upward. The lower side of the diameter-expanded part 10B has an upper end part formed into the shape of a circular truncated cone which is tapered upward. The lower side of the diameter-expanded part 10B has a lower end part formed into the shape of a circular truncated cone which is tapered downward. The lower end of the lower side of the diameter-expanded part 10B has an outer diameter that equals that of the shaft member body 10A. The diameter-expanded part 10B has a lower end surface provided with a first column 10F extending downward on the central axis of the columnar shape. The first column 10F has an outer diameter that equals that of the opening 10E provided in the upper end surface of the shaft member body 10A. The first column 10F has a lower end surface with a chamfered circumference. The diameter-expanded part 10B is connected to the shaft member body 10A by inserting the first column 10F into the opening 10E provided in the upper end surface of the shaft member body 10A. The lower end surface of the lower side of the diameter-expanded part 10B abuts against the upper end surface of the shaft member body 10A. Thus, the shaft member 10 is provided with the diameter-expanded part 10B on an upper end part thereof serving as a distal end part.

The root part 10C has a columnar shape and extends in the up-down direction. The root part 10C has an outer diameter larger than that of the shaft member body 10A. The root part 10C has a lower end surface provided with an opening 10G on a central axis of the columnar shape. The opening 10G is used in mounting the shaft member 10 on a mount (not illustrated) of the device. The root part 10C has an upper end surface provided with a second column 10H extending upward on the central axis of the columnar shape. The second column 10H has an outer diameter that equals that of the opening 10E provided in the lower end surface of the shaft member body 10A. The second column 10H has an upper end surface with a chamfered circumference. The root part 10C is connected to the shaft member body 10A by inserting the second column 10H into the opening 10E provided in the lower end surface of the shaft member body 10A. The upper end surface of the root part 10C abuts against the lower end surface of the shaft member body 10A.

The cushion member 10D is formed into an annular shape having an upper end surface and a lower end surface. The cushion member 10D is elastic. The cushion member 10D has an outer diameter that substantially equals that of the root part 10C. The cushion member 10D has an inner diameter of the annular shape that equals the outer diameter of the shaft member body 10A. The shaft member body 10A is inserted through the cushion member 10D so that a lower end surface of the cushion member 10D abuts against the upper end surface of the root part 10C. Thus, the shaft member 10 has the cushion member 10D provided on an outer periphery of a lower end part thereof serving as a proximal end part. In other words, the proximal end of the shaft member 10 is located lower in the gravity direction than the distal end of the shaft member 10.

The cylinder member 10J is formed into a cylindrical shape and extends in the direction of the central axis of the shaft member 10. The cylindrical member 10J has a vertical dimension that is substantially one half of a vertical dimension of the shaft member 10. The vertical dimension of the cylinder member 10J is shorter than the length of the shaft member body 10A. In other words, the vertical length of the cylinder member 10J is shorter than the lengths of the shaft member 10 and the shaft member body 10A. The cylinder member 10J has an outer diameter that equals that of the lower side of the diameter-expanded part 10B. The cylinder member 10J has an inner diameter slightly larger than the outer diameter of the shaft member body 10A. The shaft member body 10A is inserted through the cylinder member 10J so that the cylinder member 10J is movable in the direction of the central axis. The inner diameter of the cylinder member 10J is smaller than an outer diameter of the lower side of the diameter-expanded part 10B and the outer diameter of the root part 10C. In other words, the outer diameter of the diameter-expanded part 10B is larger than the inner diameter of the cylinder member 10J. As a result, the cylinder member 10J through which the shaft member body 10A is inserted is prevented from dropping out of the shaft member body 10A.

The support member 12 is formed into a cylindrical shape and extends in the up-down direction. The support member 12 has an inner diameter slightly larger than the outer diameter of the cylinder member 10J and the outer diameter of the lower side of the diameter-expanded part 10B. The support member 12 has an outer diameter slightly smaller than that of the root part 10C. The support member 12 has a flange 12A formed on an upper end of an outer peripheral surface thereof and spreading radially outward. The shaft member body 10A and the cylinder member 10J are inserted through the support member 12 so that the support member 12 is movable in the up-down direction. The inner diameter of the support member 12 is smaller than the outer diameter of the root part 10C. As a result, the support member 12 is prevented from dropping from the root part 10C.

The moving member 13 includes a connecting plate 13C and a pair of arm members 13B. The connecting plate 13C is a flat plate which extends in the up-down direction and is elongate in the right-left direction (as viewed in FIG. 1; and the same shall apply hereinafter). The arm members 13B extend in the front-rear direction (as viewed in FIG. 1; and the same shall apply hereinafter). Each arm member 13B has a rectangular cross-section perpendicular to the front-rear direction. The arm members 13B respectively have proximal ends connected to upper sides of right and left ends of the connecting plate 13C with distal ends thereof being directed frontward. The paired arm members 13B have respective sides opposed to and parallel to each other. A distance between the opposed sides is slightly larger than the outer diameter of the support member 12. The paired arm members 13B have respective upper end surfaces located at the same height.

A rear side of the connecting plate 13C is connected to a drive device (not illustrated). As a result, the moving member 13 can be moved upward and downward by driving the drive device (not illustrated). The upper end surfaces of the arm members 13B of the moving member 13 abut against the underside of the flange 12A of the support member 12. As a result, the moving member 13 can move the support member 12 upward and downward by driving the drive device.

The taking-out member 14 has a pair of claw members 14A. Each claw member 14A has a claw member body 14B and a holding part 14C. The claw member body 14B extends in the up-down direction. The claw member body 14B has a rectangular cross-section perpendicular to the up-down direction (not illustrated). The holding part 14C extends downward from a lower end of the claw member body 14B. The holding part 14C has a rectangular cross-section perpendicular to the up-down direction (not illustrated). A dimension of each holding part 14C in the right-left direction is smaller than that of each claw member body 14B.

In the paired claw members 14A, the claw member bodies 14B have respective sides opposed to and parallel to each other, and the holding parts 14C have respective sides opposed to and parallel to each other. A distance between the opposed sides of the holding parts 14C is slightly larger than that of the claw member bodies 14B. The paired claw members 14A are arranged immediately above the shaft member 10 to be symmetric about the central axis of the shaft member 10. In the paired claw members 14A, the distance between the opposed sides of the holding parts 14C is larger than an outer diameter of a seal member S which will be described later.

The paired claw members 14A have respective upper ends connected to a drive section (not illustrated). The paired claw members 14A are movable in the right-left direction in a symmetric manner about the central axis of the shaft member 10 by drive of the drive section. In other words, the distance between the opposed sides of the paired claw members 14A is changeable by drive of the drive section. Furthermore, the paired claw members 14A are also movable in the up-down direction, in the right-left direction and in the front-rear direction by drive of the drive section.

Next, the working of the seal member taking-out device will be described. First, a plurality of annular seal members S, which are O-rings, is stacked on the shaft member 10 downward from the upper side as illustrated in FIG. 1. In this case, the seal members S are also stacked on the cylinder member 10J through which the shaft member body 10A is inserted. The flange 12A of the support member 12 abuts against the lowermost seal member S from below. Furthermore, the uppermost seal member S located at the distal end side of the shaft member 10 covers an outer peripheral surface of the lower side of the diameter-expanded part 10B. Each annular seal member S has an inner diameter slightly larger than the outer diameter of the lower side of the diameter-expanded part 10B and the outer diameter of the cylinder member 10J. Next, the paired claw members 14A of the taking-out member 14 are caused to abut against the uppermost seal member S from the right-left direction thereby to hold the seal member S. Then, the seal member S held by the claw members 14A is upwardly taken out from the shaft member 10.

Subsequently, the moving member 13 is moved upward, that is, in the direction of the distal end of the shaft member 10 so that the seal members S are moved upward together with the support member 12 as illustrated in FIG. 2. In this case, an upward movement distance of the moving member 13 equals an axial dimension of the annular shape of one seal member S. In more detail, a detection switch (not illustrated) is provided to be radially spaced by a predetermined dimension from the outer peripheral surface of the lower side of the diameter-expanded part 10B of the shaft member 10. The detection switch can detect whether or not the uppermost seal member S covers the outer peripheral surface of the lower side of the diameter-expanded part 10B. As a result, when the seal member S is upwardly taken out by the claw members 14A, the moving member 13 is moved upward until the second uppermost seal member S covers the outer peripheral surface of the lower side of the diameter-expanded part 10B, so that the moving member 13 moves the seal members S upward together with the support member 12. Then, when the detection switch detects that the second uppermost seal member S covers the outer peripheral surface of the lower side of the diameter-expanded part 10B, the upward movement of the moving member 13 is stopped.

Figure 4:
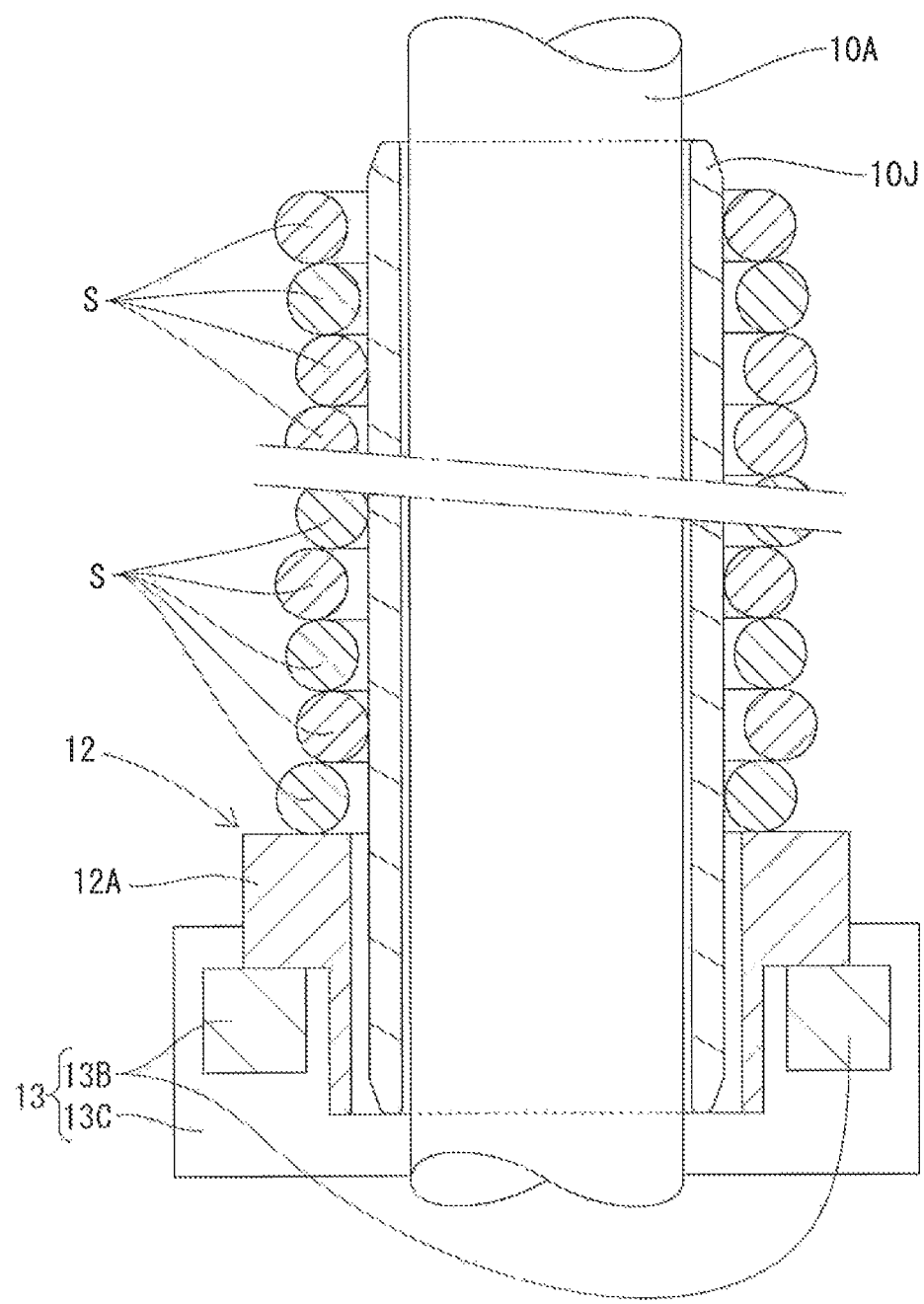
FIG. 4 is a longitudinal section of the seal member taking-out device of the first embodiment, illustrating the stacked seal members randomly displaced radially with respect to a central axis of the shaft member so that inner peripheral surfaces of the seal members randomly abut against an outer peripheral surface of the cylinder member.

In this case, the inner peripheral surfaces of the seal members S are randomly displaced radially with respect to a central axis of the shaft member 10 and randomly abut against the outer peripheral surface of the cylinder member 10J (refer to FIG. 4). As a result, a friction force is generated on the outer peripheral surface of the cylinder member 10J by the random abutment of the inner peripheral surfaces of the seal members S thereagainst. Furthermore, each seal member S is elastic. As a result, the seal members S stacked at a lower side are compressed more so that the inner diameters of the annular shapes of the seal members S become smaller as compared with the seal members S stacked at an upper side. As the result, the seal members S stacked at a lower side more easily abut against the outer peripheral surface of the cylinder member 10J. Consequently, when the moving member 13 is moved upward and moves the seal members 3 upward together with the support member 12, the seal members S are moved upward by the moving member 13 and also the cylinder member 10J is moved upward, that is, in the direction of the distal end of the shaft member 10. Furthermore, the cylinder member 10J can be moved upward together with the seal members S to an elevated position where the upper end of cylinder member 10J abuts against the circular truncated cone formed on lower end part of the lower side of the diameter-expanded part 10B.

The seal members S are thus upwardly taken out from the shaft member 10 by the taking-out member 14, and the moving member 13 is repeatedly moved upward with the result that the number of seal members S stacked on the shaft member 10 is reduced. Then, the number of seal members S randomly abutting against the outer peripheral surface of the cylinder member 10J is also reduced. In other words, the number of seal members S stacked on the outer peripheral surface of the cylinder member 10J is reduced after the upward movement of the cylinder member 10J. Furthermore, since the pressure applied to the seal members S stacked on the cylinder member 10J at a lower side becomes smaller, the inner diameters of the annular shapes of the seal members S stacked at a lower side, which have been rendered smaller, restore their original states. Furthermore, since the number of seal members S with the inner peripheral surfaces randomly abutting against the outer peripheral surface of the cylinder member 10J is reduced, the friction force generated by the random abutment of the inner peripheral surfaces of the seal members S against the outer peripheral surface of the cylinder member 10J becomes smaller. When the friction force becomes smaller than the gravity force applied to the cylinder member 10J, the cylinder member 10J falls downward with the result that the lower end of the cylinder member 10J collides against the cushion member 10D (refer to FIG. 3). In other words, the cylinder member 10J falls under its own weight when the seal members S stacked on the outer peripheral surface thereof are taken out and the friction force is accordingly rendered smaller.

As described above, a plurality of seal members S can be stacked on the shaft member 10 and the cylinder member 10J in this seal member taking-out device. As a result, the dimensions of the seal member taking-out device can be rendered smaller as compared with the case where the seal members S are aligned with outer peripheral surfaces thereof adjacent to one another in order to supply a large number of seal members S. Furthermore, the inner peripheral surfaces of the seal members S stacked on the cylinder member 10J do not abut against the outer peripheral surface of the shaft member 10. As a result, no friction force is generated between the seal members S and the shaft member 10 in a section where the cylinder member 10J is disposed in the up-down direction. Consequently, the friction force generated between the seal members S and the shaft member 10 can be rendered smaller in this seal member taking-out device as compared with the case where the shaft member 10 is not inserted through the cylinder member 10J and the seal members S are stacked on the shaft member 10 from the lower end to the upper end. As a result, the seal members S stacked on the shaft member 10 can easily be moved upward by the moving member 13 in this seal member taking-out device.

Accordingly, the seal member taking-out device of the embodiment can successfully take out a large number of seal members S.

Furthermore, the cylinder member 10J in the invention is moved in the direction of the distal end of the shaft member 10 together with the seal members S by the friction force generated by the abutment of the inner peripheral surfaces of the stacked seal members S against the outer peripheral surface of the cylinder member 10J. Thus, the distance in which the inner peripheral surfaces of the seal members S rub against the outer peripheral surface of the shaft member 10 can be rendered shorter as compared with the case where the shaft member 10 is not inserted through the cylinder member 10J and the seal members S are stacked on the shaft member 10 from the lower end to the upper end. As a result, this seal member taking-out device can suppress wear or the like caused by the rubbing of the inner peripheral surfaces of the seal members S against the outer peripheral surface of the shaft member 10.

Furthermore, the proximal end of the shaft member 10 is located lower in the gravity direction than the distal end of the shaft member 10 in this seal member taking-out device. Furthermore, the cylinder member 10J in the invention falls under its own weight when the number of seal members S stacked on the outer peripheral surface thereof is reduced after the upward movement and the friction force is accordingly rendered smaller. Thus, the friction force generated by the abutment of the seal members S against the outer peripheral surface of the cylinder member 10J is rendered smaller as the number of seal members S stacked on the cylinder member 10J is reduced. Then, the cylinder member 10J can fall downward under the gravity force applied thereto. Consequently, this seal member taking-out device needs not to be provided with any mechanism for moving the cylinder member 10J downward when the upper end of the cylinder member 10J reaches a predetermined height. In other words, the mechanisms of the seal member taking-out device can be simplified.

Furthermore, the shaft member 10 in this invention has the diameter-expanded part 10B which is formed at the distal end part thereof to have the outer diameter larger than the inner diameter of the cylinder member 10J. Thus, since the cylinder member 10J is moved upward so that the upper end thereof abuts against the diameter-expanded part 10B, the cylinder member 10J can be prevented from dropping out of the shaft member 10 when moved upward. Furthermore, when the seal members S are moved upward by the moving member 13 and reach the diameter-expanded part 10B, radial displacement of the seal members S relative to the central axis of the shaft member 10 can be suppressed, with the result that the seal members S can easily be taken out by the taking-out member 14 in this seal member taking-out device.

Furthermore, the shaft member 10 in this invention has the cushion member 10D provided on the outer periphery of the proximal end part thereof. Thus, when the cylinder member 10J, which has been moved upward together with the seal members S by the friction force generated by the abutment of the inner peripheral surfaces of the seal members S stacked on the outer peripheral surface of the cylinder member 10J, falls downward, the lower end of the cylinder member 10J collides against the cushion member 10D. Since the cushion member 10D can soften the impact caused when the cylinder member 10J falls downward and the lower end thereof collides against the cushion member 10D, damage to the cylinder member 10J can be suppressed.

The present invention should not be limited to the embodiment described above with reference to the drawings, but the technical scope of the invention encompasses the following embodiments, for example.

(1) Although the seal members are the O-rings in the foregoing embodiment, the seal members may be annular oil seals, lip seals or the like.

(2) Although the diameter-expanded part and the root part are discrete from the shaft member body in the foregoing embodiment, at least one of the diameter-expanded part and the root part may be formed integrally with the shaft member body. In this case, the cylinder member is formed of an elastic material and is provided with a slit extending in the direction of the central axis from one end to the other end of the outer peripheral surface. As a result, the shaft member body can be inserted through the cylinder member while the cylinder member is radially spread and flexed.

(3) Although the seal member is held by the paired claw members in the foregoing embodiment, the seal member may be held by two or more claw members.

(4) Although an up-down dimension of the cylinder member is substantially one half of an up-down dimension of the shaft member in the foregoing embodiment, the up-down dimension of the cylinder member may be shorter or longer than substantially one half of the up-down dimension of the shaft member.

(5) Although the shaft member extends in the up-down direction in the foregoing embodiment, the shaft member may be inclined relative to the vertical direction as long as the cylinder member, which has been moved upward together with the seal members by the friction force generated by the abutment of the inner peripheral surfaces of the stacked seal members against the outer peripheral surface of the cylinder member, can fail downward.

(6) Although the detection switch is used in the foregoing embodiment to detect whether or not the uppermost seal member stacked on the shaft member covers the outer peripheral surface of the lower side of the diameter-expanded part, a displacement detecting laser unit or the like may be used for the detection.

(7) Although the opening is provided in the lower end surface of the root part in the foregoing embodiment, a columnar part extending downward may be provided on the lower end surface of the root part. In this case, the columnar part is inserted through a hole provided in the mount so that the shaft member may be mounted on the mount.

EXPLANATION OF REFERENCE SYMBOLS

S . . . seal member, 10 . . . shaft member, 10B . . . diameter-expanded part, 10D . . . cushion member, 10J . . . cylinder member, 13 . . . moving member, and 14 . . . taking-out member.

The invention claimed is:

1. A seal member taking-out device, comprising:
    a shaft member which is columnar or cylindrical;
    a cylinder member which is cylindrical and through which the shaft member is inserted so that the cylinder member is movable in a direction of a central axis of the shaft member, the cylinder member being shorter than the shaft member and extending in the direction of the central axis of the shaft member;
    an arm member configured to move upward supporting seal members stacked along outer peripheries of the shaft member and the cylinder member;
    a claw member configured to take out the uppermost seal member from the shaft member.

2. The seal member taking-out device according to claim 1, wherein the cylinder member is moved in the direction of a distal end of the shaft member together with the seal members by a friction force generated when inner peripheral surfaces of the stacked seal members abut against an outer peripheral surface of the cylinder member.

3. The seal member taking-out device according to claim 2, wherein the shaft member has a proximal end located lower in a gravity direction than the distal end thereof, and the cylinder member is configured to fall under its own weight when a number of the seal members stacked on the outer peripheral surface of the cylinder member is reduced after upward movement with a result that the friction force is rendered smaller.

4. The seal member taking-out device according to claim 1, wherein the shaft member has a diameter-expanded part formed on a distal end part thereof to have an outer diameter larger than an inner diameter of the cylinder member.

5. The seal member taking-out device according to claim 1, wherein the shaft member has a cushion member provided on an outer periphery of a proximal end part thereof.

6. The seal member taking-out device according to claim 3, wherein the shaft member has a diameter-expanded part formed on a distal end part thereof to have an outer diameter larger than an inner diameter of the cylinder member.

7. The seal member taking-out device according to claim 6, wherein the shaft member has a cushion member provided on an outer periphery of a proximal end part thereof.

8. A seal member taking-out device comprising:
    a shaft member which is columnar or cylindrical;
    a cylinder member which is cylindrical and through which the shaft member is inserted so that the cylinder member is movable in a direction of a central axis of the shaft member, the cylinder member being shorter than the shaft member and extending in the direction of the central axis of the shaft member;
    a moving member which moves a plurality of seal members in a direction of a distal end of the shaft member, the seal members being stacked on the shaft member and the cylinder member; and
    a taking-out member which takes out the seal members from the distal end of the shaft member, and wherein the cylinder member is moved in the direction of the distal end of the shaft member together with the seal members by a friction force generated when inner peripheral surfaces of the stacked seal members abut against an outer peripheral surface of the cylinder member.

9. The seal member taking-out device according to claim 8, wherein the shaft member has a proximal end located lower in a gravity direction than the distal end thereof, and the cylinder member is configured to fall under its own weight when a number of the seal members stacked on the outer peripheral surface of the cylinder member is reduced after upward movement with a result that the friction force is rendered smaller.

10. The seal member taking-out device according to claim 9, wherein the shaft member has a diameter-expanded part formed on a distal end part thereof to have an outer diameter larger than an inner diameter of the cylinder member.

11. The seal member taking-out device according to claim 9, wherein the shaft member has a cushion member provided on an outer periphery of a proximal end part thereof.

12. The seal member taking-out device according to claim 8, wherein the shaft member has a diameter-expanded part formed on a distal end part thereof to have an outer diameter larger than an inner diameter of the cylinder member.

13. The seal member taking-out device according to claim 8, wherein the shaft member has a cushion member provided on an outer periphery of a proximal end part thereof.

* * * * *